March 15, 1927.  
R. R. IRVINE  
1,620,891  
COMBINATION SAW AND SQUARE  
Filed July 6, 1926
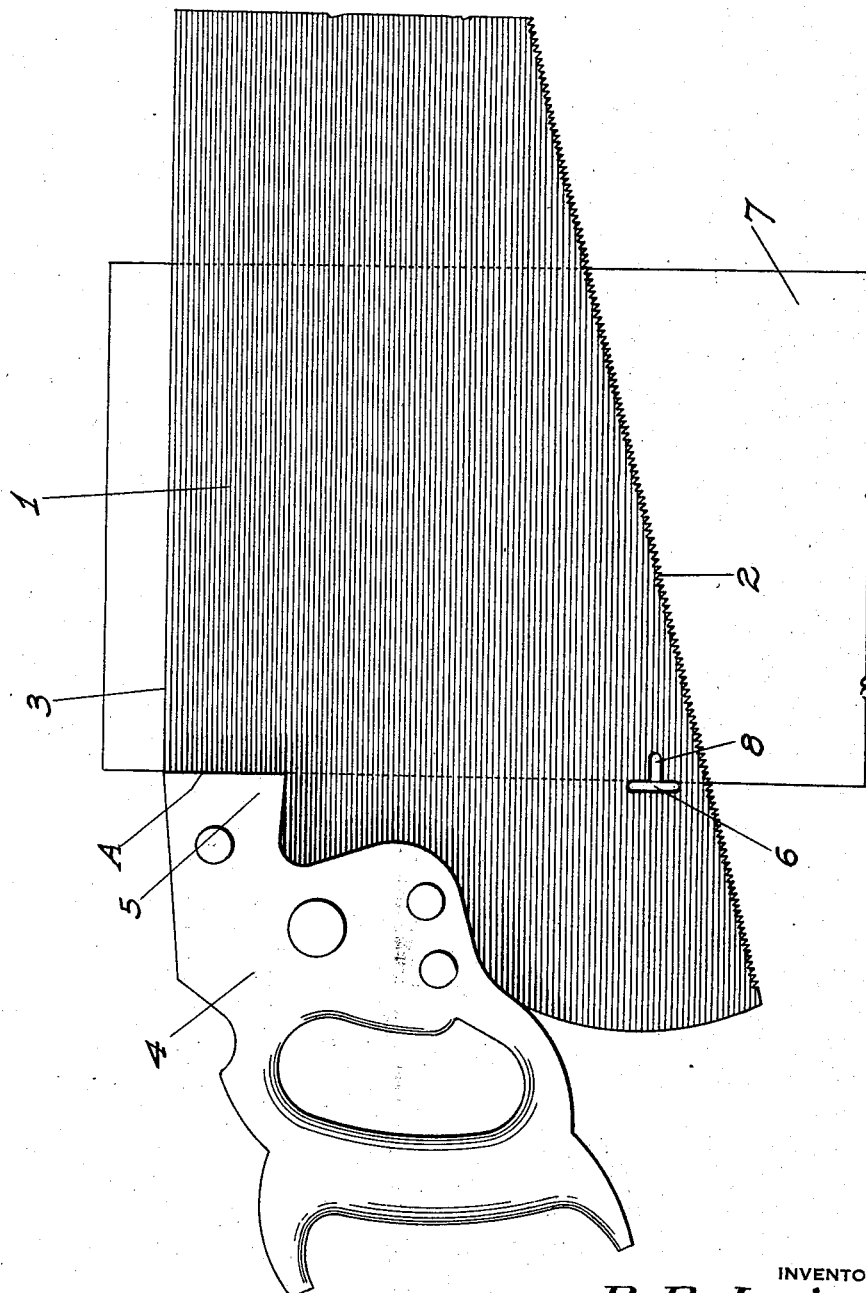
INVENTOR  
*R.R.Irvine*  
BY  
ATTORNEY Patented Mar. 15, 1927.

1,620,891

UNITED STATES PATENT OFFICE.

ROBERT R. IRVINE, OF MOKELUMNE HILL, CALIFORNIA.

COMBINATION SAW AND SQUARE.

Application filed July 6, 1926. Serial No. 120,668.

This invention relates to improvements in carpenters' tools, my principal object being to provide a hand saw of ordinary type in which is incorporated as a unit therewith a feature which makes it easily possible to set the back edge of the saw so that it will be at right angles to one edge of a board, etc., so that said saw edge can be used as a straight edge and a pencil guide or ruler for marking on the board.

This implement can therefore be used in place of the usual carpenter's square in certain cases as well as for cutting purposes, and the operations of the worker who has frequently to mark boards and then cut them can be considerably expedited. At the same time the feature which enables the saw to thus serve as a square does not in any way interfere with the cutting operations of the saw and there is nothing to move or adjust.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

The figure on the drawing is a fragmentary side elevation of a saw showing my square feature thereof and with the saw in position as in use for squaring purposes.

Referring now more particularly to the characters of reference on the drawings, the saw comprises the usual blade portion 1 having teeth 2 along one edge, the opposite edge 3 being perfectly straight from end to end. A handle 4 of ordinary character projects rearwardly from the blade, the upper end of the handle being adjacent the edge 3 and having a portion 5 projecting toward the toothed edge of the blade, the forward edge A of said portion 5 being cut so as to extend at right angles to the edge 3.

Cut through the blade adjacent the toothed edge is a slot 6 of such an extent as not to weaken the blade. One edge of said slot is in exact longitudinal alinement with the edge A of the handle member 5. It will therefore be evident that if said edge A abuts against one edge of a board 7 and said slot edge is also alined with the board edge, the edge 3 of the saw will then lie at a right angle to the board edge and may be used as a gage or ruler for drawing a line on the board.

The slot 6 preferably has a laterally extending portion 8 intermediate its ends, which facilitates sighting through the slot, this slot 8 being substantially parallel to the straight edge 3 of the saw blade. The slot is necessary in lining up the saw edge so that it may serve as a square, since the handle edge A alone, and which forms a stop or abutment for engagement with the edge of the board, cannot be depended upon. This is for the reason that the length of the edge A must be quite short in order not to interfere with the use of the saw for cutting purposes through its entire possible range of operations. Therefore with such edge A alone accurate setting of the saw edge 3 relative to the board could not be depended upon.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A combined saw and square comprising a toothed blade whose edge opposite the teeth is straight, a handle for the blade having a portion terminating at its inner end and adjacent said straight edge in an edge extending at right angles thereto; the blade between the said handle portion and the tooth edge having a sighting slot, one edge of which is alined with the handle-portion edge, and another slot substantially parallel to the straight edge of the blade being cut into said blade from the alined edge of the first-named slot.

In testimony whereof I affix my signature.

ROBERT R. IRVINE.